United States Patent [19]

Chen et al.

[11] Patent Number: 4,756,281
[45] Date of Patent: Jul. 12, 1988

[54] METHOD, AND A VALVING ARRANGEMENT, FOR IMPROVING AIR-FUEL MIXING

[75] Inventors: Tze-Ning Chen, Princeton; Anthony D. Onuschak, Kendall Park, both of N.J.

[73] Assignee: Ingersoll-Rand Company, Woodcliff Lake, N.J.

[21] Appl. No.: 85,507

[22] Filed: Aug. 14, 1987

Related U.S. Application Data

[62] Division of Ser. No. 859,366, May 5, 1986, abandoned.

[51] Int. Cl.$^4$ .............................................. F01L 1/04
[52] U.S. Cl. ............................ 123/90.6; 123/188 S; 123/188 VA
[58] Field of Search ............ 123/188 S, 188 VA, 90.6

[56] References Cited

U.S. PATENT DOCUMENTS

| | | | | |
|---|---|---|---|---|
| 2,593,769 | 4/1952 | Kollsman | .......................... | 123/188 S |
| 2,647,500 | 8/1953 | Lang | .................................... | 123/90.6 |
| 3,146,764 | 9/1964 | Elsbett | ................................. | 123/90.6 |
| 3,981,281 | 9/1976 | Deschler | .............................. | 123/90.6 |
| 4,438,740 | 3/1984 | Slee | ................................... | 123/188 S |

FOREIGN PATENT DOCUMENTS 527918  4/1921  France ............................... 123/90.6

Primary Examiner—Ronald B. Cox
Attorney, Agent, or Firm—B. J. Murphy

[57] ABSTRACT

The method comprises a couple of features: (a) late closing of an air intake valve (for a cylinder) to induce a high-velocity, air injection just before closure, and (b) admitting fuel gas into the cylinder via the air intake valve. The valving arrangement comprises a valve and a seat therefore having mating surfaces which substantially effect an initial closure of the valve on the seat at only one side of the valve. As a consequence, a high-velocity jet of air streams into the associated cylinder, via the other, later-closing side of the valve, just before full valve closure. The high-velocity air injection, the same being a purposely-directed, swirl-generating, injection, according to the method or valving arrangement, induces an enhanced air-fuel admixing in the cylinder.

2 Claims, 1 Drawing Sheet

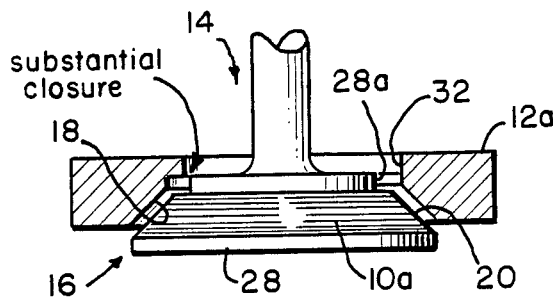
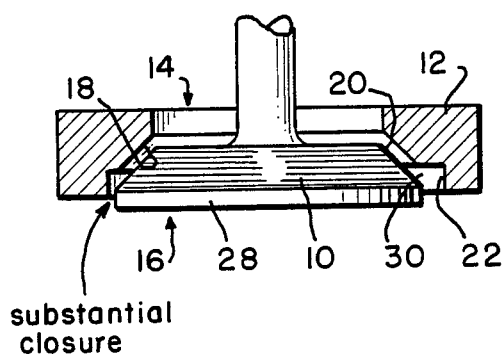
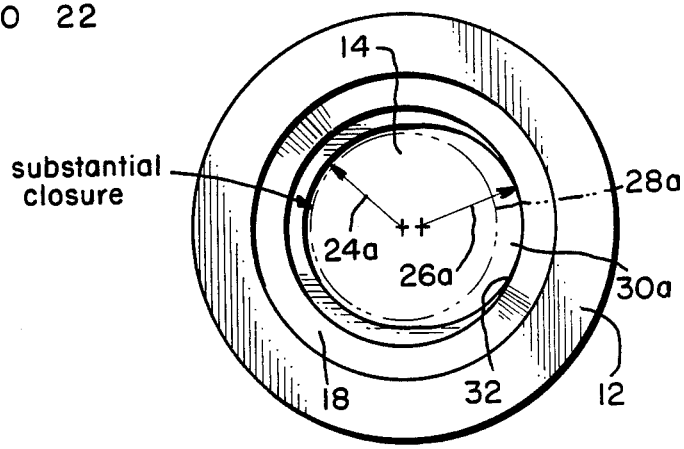
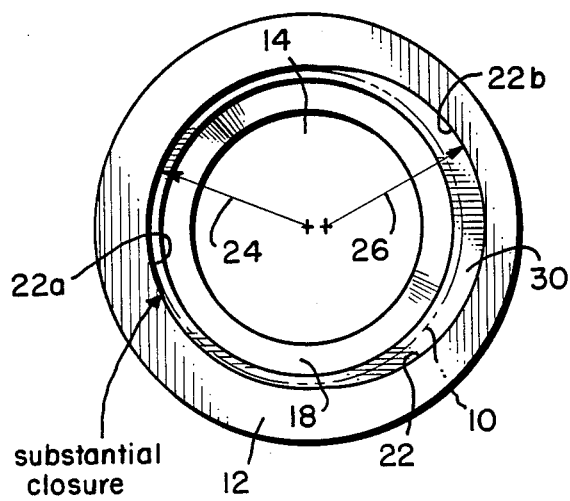

METHOD, AND A VALVING ARRANGEMENT, FOR IMPROVING AIR-FUEL MIXING

This is a division of application Ser. No. 859,366 filed May 5, 1986, now abandoned.

This invention pertains to a novel method, and a valving arrangement for improving fuel/air mixing when gaseous fuel is directly injected either into a cylinder or into the cylinder's air intake passage during the intake process, and in particular, to such a method and valving arrangement which provides for a high-velocity air injection into the cylinder to improve air-fuel admixing swirl.

In a turbocharged, scavenged gas engine, for example, the gaseous fuel is generally injected directly into the cylinder during the intake stroke. The mixing of the fuel and air streams depends on the flow pattern and turbulence which, in turn, are affected by the intake passaqge configuration, and the valve size and location relative to the fuel injection point. Experience shows us that the mixing is generally poor, and that the mixture at the end of the compression stroke is far from homogeneous. Although limited improvements can be made by optimizing the air intake passage direction to generate swirl, the results are not good enough, from the standpoint of minimizing exhaust emission, and cycle-to-cycle variations in firing pressure. An improved method and a valving arrangement for improving the mixing has been needed.

It is an object of this invention to set forth just such a needed method and a valving arrangement for improving air-fuel mixing.

It is particularly an object of this invention to set forth a method for improving air-fuel mixing, in an engine having (a) fuel injection, (b) a cylinder with a reciprocating piston, and (c) an air intake valve, comprising the steps of opening the valve when the piston proceeds to move in its downstroke holding the valve open as the piston downstrokes at least until fuel is injected; injecting fuel as the piston nears its bottom dead center; closing the valve to within from approximately ten to two percent of its full lift, until the piston reaches bottom dead center to induce a high-velocity air injection; and fully closing the valve coincident with the piston reaching bottom dead center.

It is also an object of this invention to set forth a valving arrangement, for improving air-fuel mixing, comprising a circular valving element; and a circular seat for said element; wherein said seat has a land upon which sealingly to receive said element; said element has a shoulder (a) for closure thereof onto said land, in a first disposition, to interdict fluid flow between said seat and said element, and (b) for removal thereof from said land, in a second disposition, to permit fluid flow therebetween; and said element and said seat further have complementary, mating surfaces which, during movement of said element from said second disposition toward said first disposition thereof, come into a substantially sealing closure therebetween at only one side of said seat to direct and to accommodate fluid flow, between said seat and element, substantially at only the side of said seat which is opposite said one side.

Further objects of this invention, as well as the novel features thereof, will become more apparent by reference to the following description taken in conjunction with the accompanying figures, in which:

FIG. 1 is a side view of an embodiment of the novel valving arrangement, the same showing the valve in full line illustration, and the valve seat in a diametrical cross-section;

FIG. 2 is a bottom view of the valve seat of FIG. 1, taken along line 2—2 in FIG. 1, and showing the valve only in phantom;

FIG. 3 is a side view like that of FIG. 1 in which, however, the early closure of a side of the valve occurs at the inlet side of the valve instead (as shown in FIG. 1) of at the outlet side; and FIG. 4 is a bottom view of the valve seat of FIG. 3, corresponding generally to FIG. 2, in which only the early-closing shoulder of the valve is shown in phantom.

According to one aspect the method for improving the air-fuel mixing in a gas engine, is to inject the fuel into the air intake passage so that partial mixing is established prior to entry of the air and fuel through the valve. The high-velocity of the air and fuel through the valve, and the turbulence generated thereby, would cause further improved mixing in the cylinder.

According to another aspect of the novel method, the air intake valve for the cylinder closes down following the normal curve; i.e., as a fuel gas is injected, and the piston approaches bottom dead center. However, when the valve closes to about ten to two percent of its full displacement, it is a teaching of this invention to keep the valve at this limited opening until the piston completes the remainder of the downstroke. Due to expansion of the air in the cylinder the pressure differential increases during this period when the valve is merely cracked open, and therefore the velocity of the air jet entering the cylinder increases significantly. Although due to the small opening the net mass flow is a small portion of the total air intake, the momentum of the air jet is high enough to improve the flow field in the cylinder. Coincident with the piston reaching bottom dead center, then, the valve must be fully closed.

The novel method also comprehends injecting a high-velocity air steam into the cylinder through only one side of the air intake valve just before the piston reaches bottom dead center.

While those skilled in this art may conceive of other means for practicing our invention, the embodiments of FIGS. 1–4 depict the best modes contemplated by us for carrying out the invention.

As shown in FIGS. 1 and 2, an air intake valve 10 for a cylinder (not shown) closes upon, and removes from, a valve seat 12, to control flow of fluid (i.e., air or air and fuel) therethrough from the inlet 14 to the outlet 16.

The seat 12 has a land 18 which is concentric with a sealing surface 20 formed on the valve 10. Consequently, as is conventional, when the surface 20 closes upon the land 18, no fluid can flow between the inlet 14 and outlet 16. However, our valving arrangement comprises means for effecting an early closure of one side of the valve 10 before the closure of the other side.

Seat 12 has a recess 22 formed of two radii. A first radius 24 forms the half 22a of the recess 22 which is at the left (in FIGS. 1 and 2), and a second radius 26 forms the half 22b of the recess 22 which is at the right. The valve 10 has an outermost shoulder 28 which effects a substantial closure of the valve at the left-hand side thereof, as the shoulder 28 and half 22a matingly substantially close upon each other; radius 24 closely approximates the radius of recess half 22a. Between recess half 22b and should 28, however, these obtains a crescent-shaped space 30 which communicates with the annular void between land 18 and surface 20. It is through this space 30 that fluid enters the cylinder (not shown) at a high velocity, to enhance a swirl in the cylinder, just prior to full valve closure.

FIGS. 3 and 4 depict an alternative valving arrangement in accordance with the invention. Here, similar or same index numbers denote similar or same components or structures as are presented in FIGS. 1 and 2. A valve 10a has a seat 12a defining the inlet 14 and outlet 16. In this embodiment, early closure of one side (i.e., the left side) of the valve 10a occurs at the inlet 14, whereas in the FIGS. 1 and 2 embodiment it occurred at the outlet 16.

The seat 12a has a surface 32 defined by two radii 24a and 26a. The former is a mating complement to a smaller-diameter shoulder 28a formed on the valve 10a, whereas the latter defines another crescent-shaped space 30a with shoulder 28a.

While we have described our invention in conjunction with specific methods of its practice and particular embodiments of valving arrangements therefor, it is to be clearly understood that this is done only by way of example, and not as a limitation to the scope of our invention as set forth in the objects thereof and in the appended claims.

We claim:

1. A method for improving air-fuel mixing, in an engine having (a) fuel injection, (b) a cylinder with a reciprocating piston, and (c) an air intake valve, wherein said valve comprises a circular valving element, and a circular seat for said element, wherein said seat has a land upon which sealingly to receive said element, said element has a shoulder (a) for closure thereof onto said land, in a first disposition, to interdict fluid flow between said seat and said element, and (b) for removal thereof from said land, in a second disposition, to permit fluid flow therebetween, and said element and said seat further have complementary, mating surfaces which, during movement of said element from said second disposition thereof, come into a substantially sealing closure therebetween at only one side of said seat, to direct and to accommodate fluid flow, between said seat and element, substantially at only a side of said seat which is opposite said one side; the method comprising the steps of:

first, opening the valve, by removing the element from the seat, to admit air into the cylinder for admixture thereof with fuel; and holding the valve open as the piston downstrokes, at least until fuel is injected; then injecting fuel into the cylinder as the piston downstrokes; and then partially closing the valve, by moving the element toward the seat, for closure onto the land, following such fuel injection, but moving the element only to within from approximately ten to two percent of its full displacement, until the piston reaches bottom dead center, to induce a high-velocity air injection into the cylinder to enhance air-fuel mixing therein; and fully closing the valve thereafter in order that the air-fuel mixture can be compressed during an ensuing upstroke of the piston.

2. A method, according to claim 1, further including:

admitting fuel into the cylinder, as aforesaid, via the air intake valve.

* * * * *